United States Patent Office 2,899,159
Patented Aug. 11, 1959

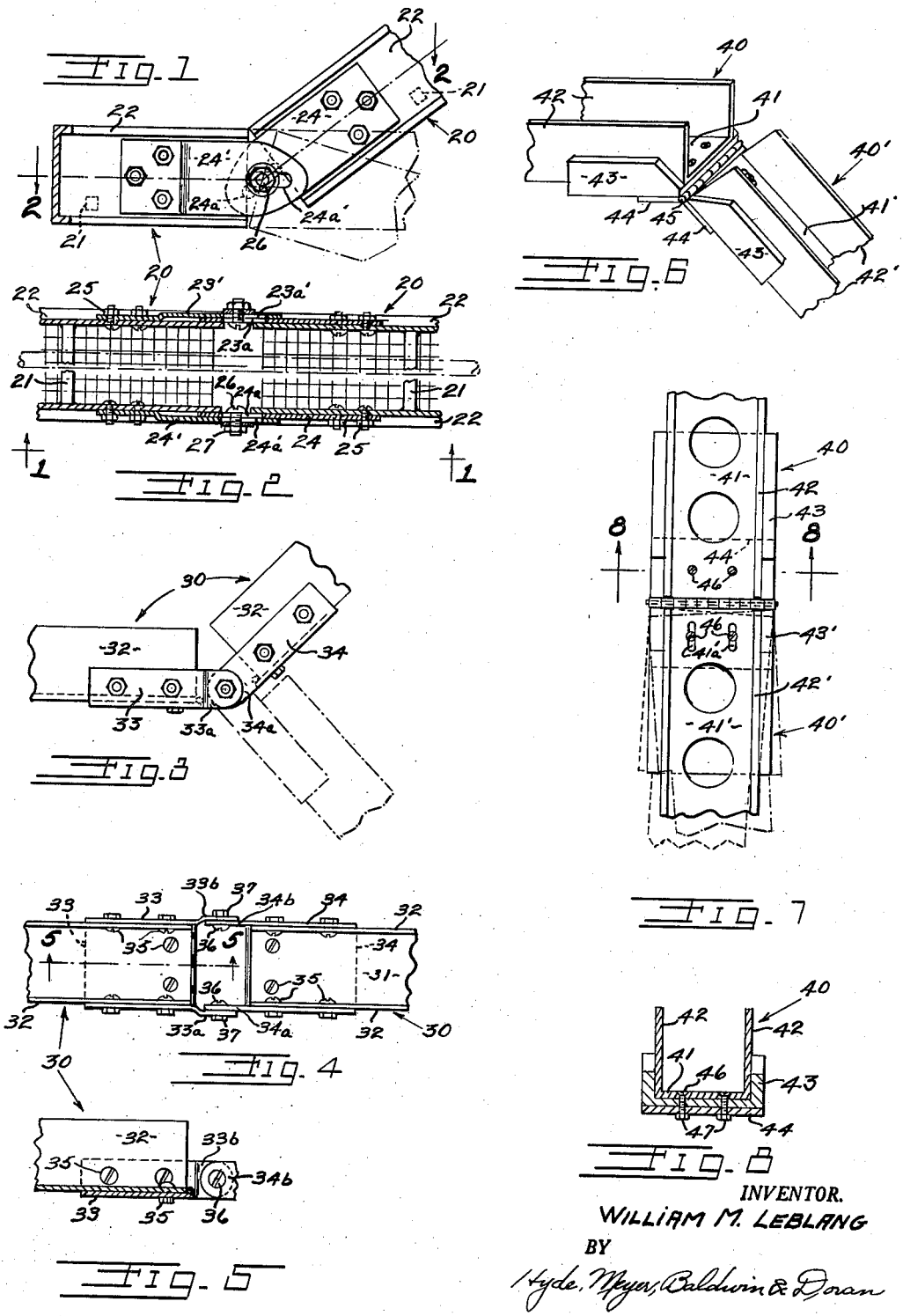

2,899,159

CABLE SUPPORT STRUCTURE

William M. Leblang, Cleveland Heights, Ohio, assignor to Hatfield Electric Company, Cleveland, Ohio, a corporation of Ohio Application May 28, 1956, Serial No. 587,641

5 Claims. (Cl. 248—49)

This invention relates to improvements in a support structure and more particularly to a cable support structure.

One of the objects of the present invention is to provide a support structure for flexible cable with the components of the structure capable of being located in different vertical, horizontal, angularly related, or inclined positions to avoid obstructions in its path and to provide a generally continuous channel shape for cable support.

A further object of the present invention is to provide a cable support structure including a pair of members for supporting a cable and means connecting the members for pivotal movement about a transverse axis to permit adjustment of the angular orientation therebetween.

A further object of the present invention is to provide a cable support structure, as set forth in the previous paragraph, with lock means for locking the members in any given pivoted position.

A further object of the present invention is to provide a cable support structure characterized by its structural simplicity, economy of manufacture, ease of assembly, ease of pivotal adjustment and locking of its component parts, and universal application for all types of installations.

Other features of this invention reside in the arrangement and design of the parts for carrying out their appropriate functions.

Other objects and advantages of this invention will be apparent from the accompanying drawings and descriptions and the essential features will be set forth in the appended claims.

In the drawings,

Fig. 1 is a side elevational view of a first form of cable support structure with the left end thereof diagonally sectioned through a vertical side member as indicated by line 1—1 of Fig. 2; and with the member on the right end thereof shown in three different positions by solid lines and dot-dash lines;

Fig. 2 is a horizontal sectional view taken along the line 2—2 of Fig. 1;

Fig. 3 is a side elevational view of a second form of support structure with the right-hand member thereof shown in two different positions in solid lines and dot-dash lines;

Fig. 4 is a top plan view of the Fig. 3 construction;

Fig. 5 is a longitudinal sectional view taken along the line 5—5 of Fig. 4;

Fig. 6 is a perspective view of a third form of cable support structure;

Fig. 7 is a top plan view of the Fig. 6 construction with one member thereof shown in three different positions by the solid, dotted and dot-dash lines;

Fig. 8 is a transverse sectional view taken along the line 8—8 of Fig. 7.

Before the cable support structure here illustrated is specifically described, it is to be understood that the invention here involved is not limited to the structural details or arrangement of parts here shown since structures embodying the present invention may take various forms. It also is to be understood that the phraseology or terminology herein employed is for purposes of description and not of limitation since the scope of the present invention is denoted by the appended claims.

Those familiar with this art will recognize that the various aspects of this invention may be applied in many ways, but it has been chosen to illustrate the same as a cable support structure for flexible electrical conduit of conventional type.

Installation in buildings of support structure for flexible electrical conduit presents problems. The support structure is generally hung from building ceilings by support brackets that must be constructed so as to permit vertical change in location of the conduit to avoid stairways, building columns, walls, pipes, machinery, etc. The support structure disclosed herein is of universal application which may have its component members readily moved relative to each other on the job to permit change in vertical location or in inclined orientation so as to avoid such obstacles while providing a generally continuous channel for supporting the flexible electrical conduit or other cable.

In each form of the invention illustrated, a pair of channel shaped members for supporting an electrical cable is illustrated with the members being connected together to form a generally continuous channel. However, these members may be of different types and shapes. Each member includes a bottom portion for providing cable support and opposite lateral side portions connected to the bottom portion to form the channel shape. For example, Figs. 1 and 2 illustrate members 20 each having a bottom portion 21 and opposite side portions 22, 22. The drawings also illustrate respectively in Figs. 3–5 and 6–8, members 30 with each having a bottom portion 31 and side portions 32, and members 40 and 40′ having respectively bottom portions 41 and 41′ and side portions 42 and 42′.

These members break down into two general types—a cable trough and a ladder-type. The cable trough is shown in Figs. 3–8, with each having its bottom and side portions integral in construction and generally U-shape in cross section to form a trough. The ladder-type is shown in Figs. 1 and 2. These are representative of the different types and shapes of cable support members. It should be clearly understood that one type may be substituted readily for another in any of the hereinafter described pivotal connecting and locking constructions between the members.

Each form of the invention illustrated discloses a means operatively connecting a pair of channel-shaped members together for alignment of the channels formed thereby and pivotally connecting these members for pivotal movement about a transverse pivotal axis oriented similar to the plane of one of the side or bottom portions while permitting relative movement between the other portions so that the angular orientation of the members may be adjusted into any selected position. This connecting means also includes a lock means for locking the members in any given pivoted position so that they will retain this orientation after the supporting structure has been erected.

In Figs. 1 and 2, the connecting means includes two pairs of straps, 23, 23′ and 24, 24′ with pairs connected to corresponding side portions 22, by bolt and nut units 25. Straps 23′ and 24′ have an outwardly bent offset therein to permit receiving straps 23 and 24 therebetween. At least one strap of each pair connected to the same member, and preferably both straps as illustrated, has an elongated slot therein, as shown at 23a, 23a', 24a, 24a'. These straps are connected together in pairs by two axially aligned bolt and nut units with each unit including a bolt 26 and nut 27. Bolts 26 extend through the aforesaid slots in axial alignment to form the pivotal axis and to secure together in pivotal relationship the pairs of straps. Hence, members 20, 20 may have the angular orientation therebetween changed by pivotal movement about this axis formed by bolts 26, three such positions being shown in Fig. 1. The slots will permit the members to be kept as close as possible to abutting relationship in all angular pivoted positions to minimize the gap between the abutting ends of members 20 and to permit variation in the spacing between the members, if so desired.

For instance, bolt 26 must move toward the right (in Fig. 1) in the slots to permit the angular relationship shown in full lines and in dot-dot-dash lines. Also, after members 20 have been angularly adjusted to their final positions and the cable supporting structure has been erected, bolts and nuts 26 and 27 may be tightened to serve as a lock means to secure the members in this position.

In Figs. 3, 4 and 5, two U-shaped elements 33, 34 are provided with each connected to one of the channel members 30 in overlapping relationship to its associated channel shape by bolt and nut units 35. These elements have portions thereof formed as two straps 33a, 33b or 34a, 34b with each strap overlying a side flange 32 of channel 30 and extending beyond the end of member 30. Straps 33a and 33b have outwardly bent offsets to straddle straps 34a and 34b respectively. These straps form two pairs with one pair 33a, 34a or 33b, 34b located on each side of the channel shape. Two bolt and nut units secure together in pivotal relationship the respective strap pairs with each unit including a bolt 36 and nut 37, securing together in pivotal relationship a pair of straps. The bolts 36 are axially aligned to provide a transverse pivotal axis, approximately in the plane of bottom or web portions 31 of channel 30, to provide a pivotal connection between members 30, 30. The members 30, 30 are easily pivoted about this axis when the units are loosened, until the desired angular orientation therebetween is achieved, two positions being shown in Fig. 3. Then, bolts and nuts 36, 37 after being tightened will serve as a lock means to lock the members 30 in that position.

In Figs. 6, 7 and 8, the connecting means includes a hinge unit having a pair of hinge leaves 44, 44 connected together by a pivot pin 45. Channel or trough members 40, 40' have welded or otherwise secured thereto U-shaped channel member reinforcement elements 43, 43'. The hinge leaves are connected respectively to the bottom portions of these reinforcement elements by bolts 46 and nuts 47. Hence, members 40, 40' may be moved relative to each other about the transverse pivot axis provided by pin 45 approximately in the plane of bottom portions 41, 41'. Also, the connection between one leaf 44 and its associated bottom portion permits relative movement therebetween about an axis perpendicular to this pivotal axis provided by pin 45. For this purpose, slots 41a' are provided in bottom portion 41' and its associated element 43' while bolt and nut units 46, 47 are carried by circular holes in leaf 44 with the bolts extending through the slots. When the units 46, 47 are loosened, angular orientation of parts 40', 43' relative to associated leaf 44 between the dot-dash line, dotted line and solid line positions in Fig. 7 is obtainable. When nuts 47 are tightened, they serve as a lock means between leaf 44 and member 40' to maintain this angular relationship. When member 40' is swung to the dot-dash line position in Fig. 7, so as to be substantially out of alignment with the longitudinal axis of the member 40 and the remote ends of these members are fixed with respect to the mounting ceiling, this angular orientation will also tend to lock hinge leaves 44 together to prevent movement around the axis of pivot pin 45.

Various changes in details and arrangement of parts can be made by one skilled in the art without departing from either the spirit of this invention or the scope of the appended claims.

What I claim is:

1. A cable support structure, comprising a pair of channel shaped members for supporting an electrical cable, each member including a bottom portion for providing cable support and opposite lateral side portions connected to said bottom portion to form said channel shape, and means connecting said members for alignment of the channels formed thereby and pivotally connecting said members for pivotal movement about a transverse pivotal axis, whereby the angular orientation of said members may be adjusted into any selected position, the bottom portion of each of said members including cross bars spaced along the length of the member and secured at opposite bar ends to said opposite side portions.

2. A cable support structure, comprising a pair of channel shaped members for supporting an electrical cable, each member including a bottom portion for providing cable support and opposite lateral side portions connected to said bottom portion to form said channel shape, and means connecting said members for alignment of the channels formed thereby and pivotally connecting said members for pivotal movement about a transverse pivotal axis, whereby the angular orientation of said members may be adjusted into any selected position, said connecting means including a hinge unit including a pair of hinge leaves connected by a pivot pin with said leaves connected respectively to corresponding portions of said members, said pivot pin having a pivot axis intersecting the planes of both said side portions and extending through said channel.

3. A cable support structure, comprising a pair of channel shaped members for supporting an electrical cable, each member including a generally horizontal bottom portion for providing cable support and opposite generally vertical lateral side portions connected to said bottom portion forming said channel shape, and means connecting said members aligning the channels formed thereby and pivotally connecting said members for pivotal movement about a transverse pivotal axis parallel to the plane of said bottom portion with relative movement between said side portions in parallel planes, said connecting means including lock means locking said members in any given pivoted position, said connecting means including two pairs of straps with each pair connected to corresponding side portions and including two bolt and nut units axially aligned along said pivotal axis with each unit respectively securing together in pivotal relationship a pair of straps, whereby said units form a pivotal connection and form said lock means between said members by tightening said bolts and nuts.

4. A cable support structure, comprising a pair of channel shaped members for supporting an electrical cable, each member including a generally horizontal bottom portion for providing cable support and opposite generally vertical lateral side portions connected to said bottom portion forming said channel shape, and means connecting said members aligning the channels formed thereby and pivotally connecting said members for pivotal movement about a transverse pivotal axis parallel to and spaced from the plane of said bottom portion with relative movement between said side portions, said connecting means including lock means locking said members in any given pivoted position; said connecting means including two pairs of straps with each pair connected to corresponding side portions, one strap of each pair connected to the same member having an elongated slot, and including two bolt and nut units axially aligned along said pivotal axis with each unit respectively extending through a slot and securing together in pivotal relationship a pair of straps, whereby said units form a pivotal connection and said lock means between said members and whereby said slots permit said members to be kept as close as possible to abutting relationship in all angular pivoted positions to form a substantially continuous channel.

5. A cable support structure, comprising a pair of channel shaped members for supporting an electrical cable, each member including a generally horizontal bottom portion for providing cable support and opposite generally vertical lateral side portions connected to said bottom portion to form said channel shape, and means connecting said members for alignment of the channels formed thereby and pivotally connecting said members for pivot movement about a transverse pivotal axis oriented similar to the plane of one of said bottom portions while permitting relative movement between said other side portions, said connecting means including lock means for locking said members in any given pivoted position so that the angular orientation of said members may be adjusted into and then locked in any selected position within the range of pivotal movement about said axis.

References Cited in the file of this patent

UNITED STATES PATENTS

| | | |
|---|---|---|
| 472,622 | Linkletter | Apr. 12, 1892 |
| 1,575,730 | Altnow | Mar. 9, 1926 |
| 1,804,954 | Rutherford | May 12, 1931 |
| 2,656,999 | Ullberg | Oct. 27, 1953 |